(12) United States Patent
Chang (10) Patent No.: US 7,278,342 B1
(45) Date of Patent: *Oct. 9, 2007

(54) TOOL CONNECTING DEVICE

(76) Inventor: Sheng Ming Chang, No. 302, Siusan Rd. Siusan Tsuen, Dayia Hsiang, Taichung Hsien 42878 (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/386,905

(22) Filed: Mar. 21, 2006

(51) Int. Cl.
*B25B 23/16* (2006.01)
*B25G 1/00* (2006.01)

(52) U.S. Cl. .................. 81/177.75; 81/177.85
(58) Field of Classification Search .......... 81/177.7, 81/177.75, 177.8, 177.85
See application file for complete search history.

(56) References Cited

U.S. PATENT DOCUMENTS

| | | | | |
|---|---|---|---|---|
| 3,855,884 A * | 12/1974 | McPeak | .................. | 81/177.75 |
| 3,897,703 A * | 8/1975 | Phipps | .................. | 81/177.75 |
| 4,114,401 A * | 9/1978 | Van Hoose | .............. | 464/120 |
| 4,807,499 A * | 2/1989 | Martinez | ................ | 81/177.75 |
| 4,936,701 A * | 6/1990 | Allen et al. | .................. | 403/57 |
| 5,069,569 A * | 12/1991 | Lieser | .......................... | 403/57 |
| 5,738,586 A * | 4/1998 | Arriaga | ...................... | 464/106 |
| 5,918,512 A | 7/1999 | Habermehl et al. | .......... | 81/438 |
| 6,092,441 A * | 7/2000 | Jarvis | ........................ | 81/177.2 |
| 6,105,473 A * | 8/2000 | Huang | ...................... | 81/177.75 |
| 6,145,416 A * | 11/2000 | Bonniot | .................... | 81/177.75 |
| 6,290,606 B1 | 9/2001 | Hodson | ..................... | 464/159 |
| 6,386,074 B1 * | 5/2002 | Yang | ......................... | 81/177.7 |
| 6,490,955 B2 * | 12/2002 | Chang-Kao et al. | ..... | 81/177.75 |
| 6,874,392 B1 | 4/2005 | Wu | ........................... | 81/177.85 |
| 7,018,298 B1 * | 3/2006 | Chiou | ........................ | 464/159 |
| 2002/0083801 A1 * | 7/2002 | Cheng | .................... | 81/177.75 |
| 2004/0214646 A1 * | 10/2004 | Chiou | ....................... | 464/158 |
| 2005/0235785 A1 * | 10/2005 | Chang | .................... | 81/177.75 |
| 2006/0260446 A1 * | 11/2006 | Chang | .................... | 81/177.75 |

* cited by examiner

*Primary Examiner*—David B Thomas
(74) *Attorney, Agent, or Firm*—Charles E. Baxley (57) ABSTRACT

A tool connecting device includes a tool mount having a non-circular socket opening for receiving a non-circular spatial engaging member of a tool shank to allow the tool shank to be selectively tilted relative to the tool mount to different angular position. An anchoring device may selectively anchor the tool shank and the tool mount together to retain the tool shank in line with the tool mount and to prevent the tool shank from being tilted relative to the tool mount to other angular positions. A magnetic member may attract the spatial engaging member of the tool shank to the tool mount. An actuating device may actuate a projection to detachably secure a tool member to the tool shank.

11 Claims, 7 Drawing Sheets

TOOL CONNECTING DEVICE

BACKGROUND OF THE INVENTION

1. Field of the Invention

The present invention relates to a tool connecting device, and more particularly to a tool connecting device for connecting a tool shank or a fastener or a work piece or a driven member to a tool mount to allow the tool shank or the fastener or the work piece or the driven member to be selectively secured to the tool mount and rotated in concert with the tool mount or to be rotated or driven by the tool mount or to be selectively tiltable or slantable relative to the tool mount.

2. Description of the Prior Art

Typical tool connecting devices comprise a tool member or a tool bit or a fastener or a work piece secured to a mandrel with a split-ring and arranged to allow the tool bit to be selectively secured to the mandrel and rotated in concert with the mandrel or to be tiltable or slantable relative to the mandrel.

For example, U.S. Pat. No. 5,918,512 to Habermehl et al. discloses one of the typical replaceable bit screwdriver assemblies also comprising a tool bit secured to a mandrel with a split-ring and arranged to allow the tool bit to be selectively secured to the mandrel and rotated in concert with the mandrel or to be tiltable relative to the mandrel. However, an additional lever tool is required to be engaged into the mandrel to selectively disengage the tool bit from the mandrel.

U.S. Pat. No. 6,290,606 to Hodson discloses another typical polygonal ball drive systems for earth auger and also comprising an earth auger selectively coupled or attached to a drive member with a number of balls. However, the earth auger may not be selectively and solidly coupled or attached to the drive member to allow the earth auger to be rotated in concert with or to be rotated or driven by the drive member.

U.S. Pat. No. 6,874,392 to Wu discloses a further typical connector of hand tool comprising an operating member selectively coupled or attached to a main body with a spring-biased ball. However, the operating member may not be selectively and solidly secured to the main body and may not be selectively and rotatably attached to the main body. The typical connectors may not be provided to rotate or drive the spark plugs that are normally engaged or located in the tiny spaces or the like in the engine chambers of the vehicles.

The present invention has arisen to mitigate and/or obviate the afore-described disadvantages of the conventional tool connecting devices.

SUMMARY OF THE INVENTION

The primary objective of the present invention is to provide a tool connecting device for connecting a tool member or a fastener or a work piece or a driven member to a tool mount to allow the tool member or the fastener or the work piece or the driven member to be selectively secured to the tool mount and rotated in concert with the tool mount or to be driven by the tool mount or to be selectively tiltable or slantable relative to the tool mount to various angular positions, and to allow the tool mount to be rotated or driven or worked in tiny or narrower working spaces.

In accordance with one aspect of the invention, there is provided a tool connecting device comprising a tool mount including a first end having a coupling device provided thereon, and including a second end having a non-circular socket opening formed therein and having at least one flat surface formed therein, a tool shank including a non-circular spatial engaging member provided on a first end and selectively engaged with the non-circular socket opening of the tool mount and having at least one curved surface formed therein for selectively engaging with the non-circular socket opening and the flat surface of the tool mount, to allow the tool shank to be selectively tilted relative to the tool mount to different angular position, and the tool shank including a second end for coupling to a tool member, and an anchoring device for selectively anchoring the tool shank and the tool mount together to retain the tool shank in line with the tool mount and to prevent the tool shank from being tilted relative to the tool mount to other angular positions.

The anchoring device includes a protrusion extended from the tool shank for selectively engaging with the socket opening of the tool mount to solidly anchor the spatial engaging member of the tool shank to the tool mount and to prevent the tool shank from being tilted relative to the tool mount.

The tool mount includes a peripheral shoulder formed in an outer portion thereof and having an inner diameter greater than that of the socket opening of the tool mount for selectively engaging with the protrusion of the tool shank.

The tool shank includes a peripheral depression formed therein and arranged for allowing the tool shank to be slanted and tilted relative to the tool mount to different angular position. The tool mount includes a retaining member disposed therein for selectively engaging with the spatial engaging member of the tool shank and for preventing the spatial engaging member of the tool shank from being disengaged from the tool mount.

The tool mount includes a magnetic member disposed therein for attracting the spatial engaging member of the tool shank to the tool mount. The tool mount includes an inner peripheral swelling extended radially and inwardly into the socket opening thereof to form a compartment therein and to receive the magnetic member therein.

The coupling device is an engaging hole formed in the first end of the tool mount. The tool shank includes a spring-biased projection attached thereto for engaging with the tool mount and for anchoring the spatial engaging member of the tool shank to the tool mount.

The spring-biased projection is extended out from the curved surface of the tool shank for engaging with the flat surface of the tool mount. The tool mount includes an indention formed therein for engaging with the spring-biased projection of the tool shank. The tool shank includes an aperture formed therein, a projection slidably received in the aperture of the tool shank, and an actuating device for actuating the projection to engage with the tool member and to detachably secure the tool member to the tool shank.

The actuating device includes an axial bore formed in the tool shank, and includes a rod slidably received in the axial bore of the tool shank, and the rod includes an actuator for engaging with the projection and for selectively moving and forcing the projection out of the tool shank to engage with the tool member. The rod includes a recess formed therein for selectively receiving the projection and for forming the actuator.

The actuating device includes a control ferrule slidably engaged onto the tool shank and coupled to the rod for moving the rod relative to the tool shank and to have the projection to be selectively received in the recess of the rod.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
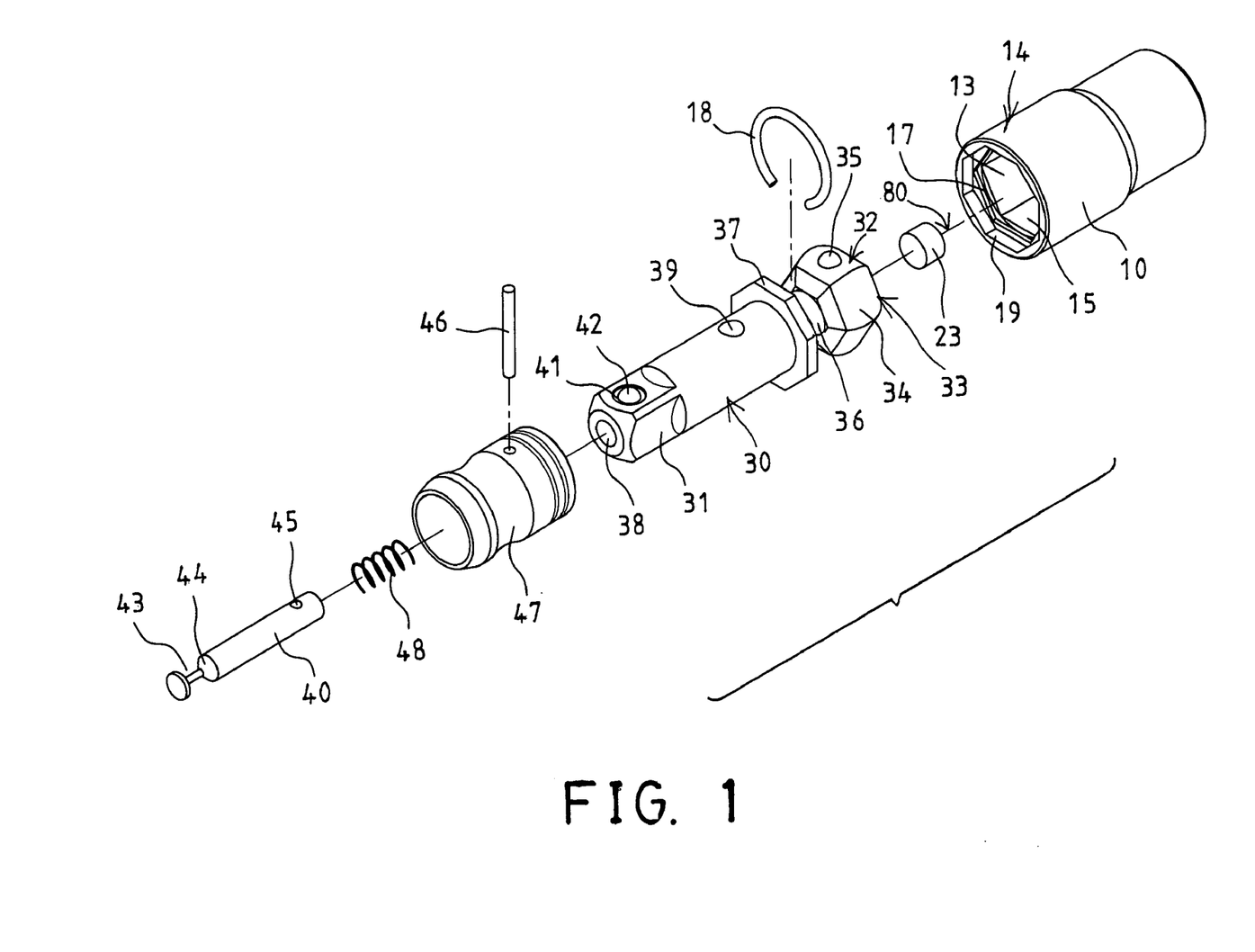
FIG. 1 is a partial exploded view of a tool connecting device in accordance with the present invention.
Figure 2:
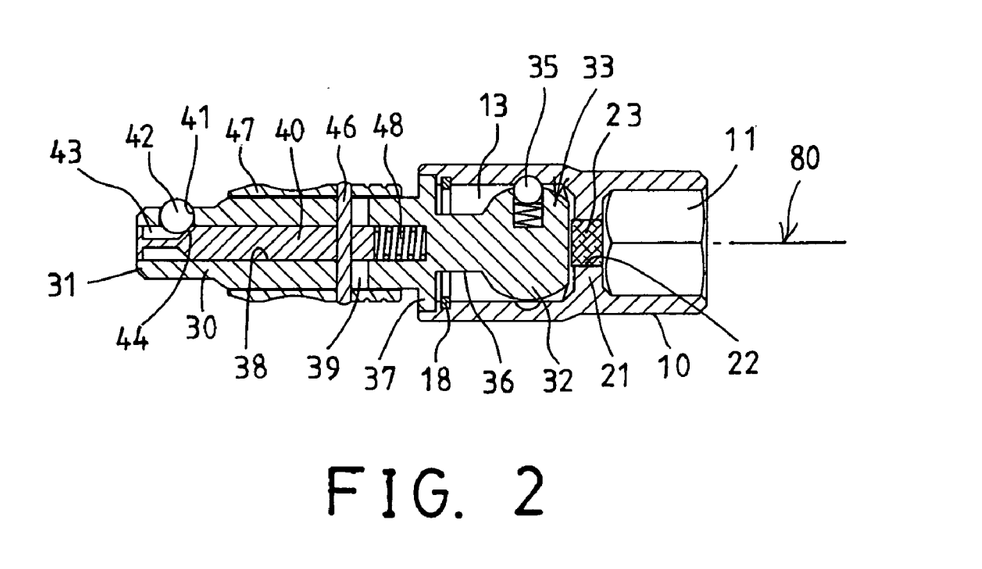
FIG. 2 is a cross sectional view of the tool connecting device.

Referring to the drawings, and initially to FIGS. 1-2, a tool connecting device in accordance with the present invention comprises a tool body or tool mount 10 including a coupling device 11, such as an engaging hole 11 provided or formed in one end thereof (FIGS. 2-3, 5-6, 12-13, and 15-16) for receiving and for engaging with and for coupling to various driven members 8 therein, such as tool bits 8 (FIGS. 13, 15-16), or for engaging with and for coupling to various driving tools (not shown), or the like which may be used to rotate or to drive the tool mount 10, or for allowing the tool mount 10 to be rotated or driven by various driving tools.

Alternatively, as shown in FIGS. 7-10, the tool mount 10 may include the other coupling device 12, such as a stem 12 provided or extended from the one end thereof for engaging with and for coupling to various driving tools or driving devices (not shown), such as pneumatic or hydraulic or power tools, or the like which may also be used to rotate or to drive the tool mount 10. The tool mount 10 further includes a socket opening 13 formed in the other end 14 thereof for slidably and/or rotatably or pivotally receiving a tool shank 30. The driven members 8 include a non-circular or hexagonal segment for engaging with the engaging hole 11 of the tool mount 10.

It is preferable that the socket opening 13 of the tool mount 10 includes a non-circular cross section, such as a hexagonal cross section having one or more flat surfaces 15 formed therein, and includes an indention 16 formed in each of the flat surfaces 15 thereof (FIG. 3), and includes a peripheral groove 17 formed in the inner peripheral portion thereof for receiving or engaging with a clamping or retaining member 18 therein, and includes an enlarged peripheral shoulder 19 formed in the outer portion thereof and having an inner diameter greater than that of the socket opening 13 of the tool mount 10.

Figure 8:
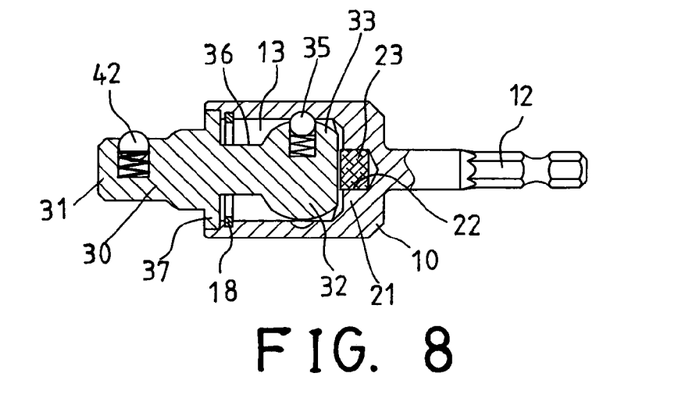
FIGS. 8, 9 are cross sectional views of the tool connecting device as shown in FIG. 7, illustrating the operation of the tool connecting device.
Figure 9:
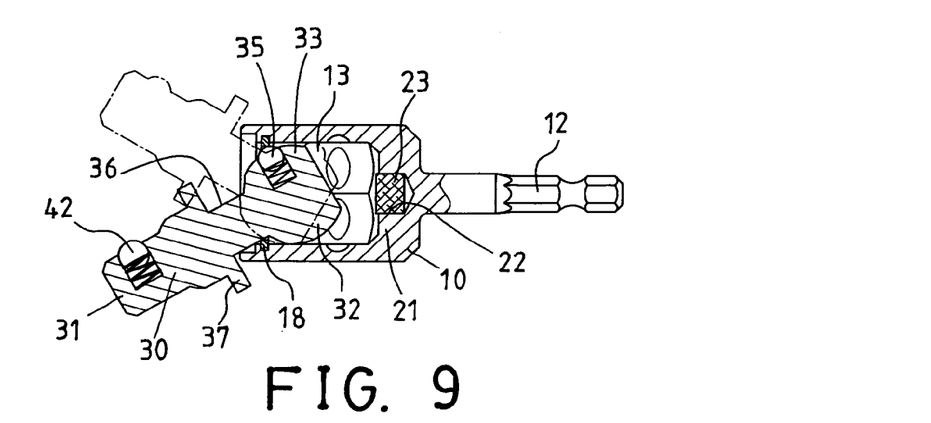
Figure 10:
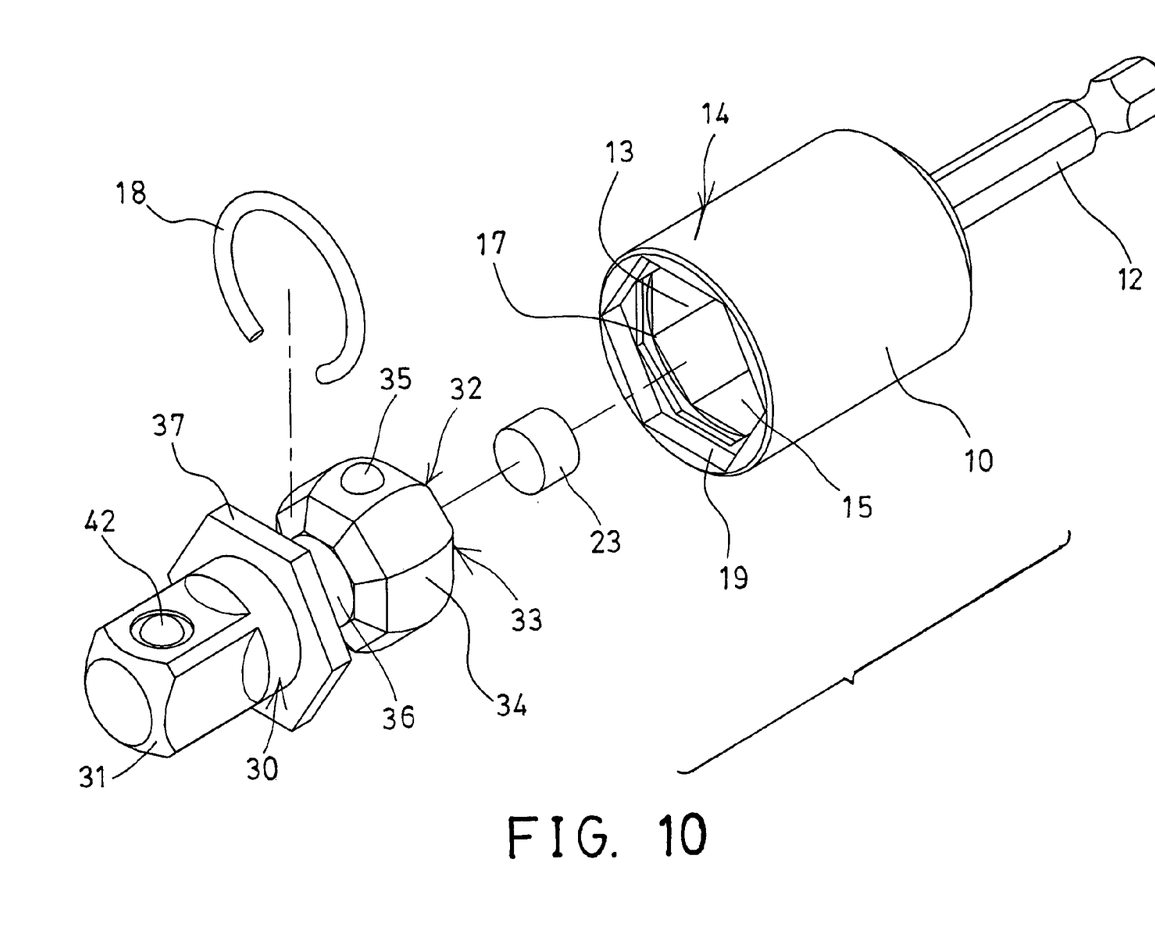
FIG. 10 is a still further partial exploded view similar to FIGS. 1, 4 and 7, illustrating the still further arrangement or application of the tool connecting device.

The tool mount 10 further includes an inner peripheral swelling 21 extended radially and inwardly into the engaging hole 11 or into the socket opening 13 thereof to form a compartment 22 therein and to receive or to attach or to secure a magnetic member 23 therein. It is preferable that the compartment 22 of the tool mount 10 is located between and communicating with the socket opening 13 and the engaging hole 11 of the tool mount 10, for allowing the magnetic member 23 also to be disposed and located between the socket opening 13 and the engaging hole 11 of the tool mount 10 (FIGS. 2-3, 5-6) or the coupling device 12 (FIGS. 8-9).

The tool shank 30 includes one end 31 for engaging with and for coupling to various driven or driving tools or tool members (not shown), such as wrenches, sockets, power tools, tool extensions, etc., and includes a rounded and spatial engaging member 32 formed or provided on the other end 33 thereof and tiltably or slantably or pivotally received in the socket opening 13 of the tool mount 10 (FIGS. 2, 3) for allowing the tool shank 30 to be selectively tilted or slanted or pivoted relative to the longitudinal axis 80 of the tool mount 10 (FIG. 3) when the rounded or spatial engaging member 32 of the tool shank 30 is engaged in the socket opening 13 of the tool mount 10.

Figure 3:
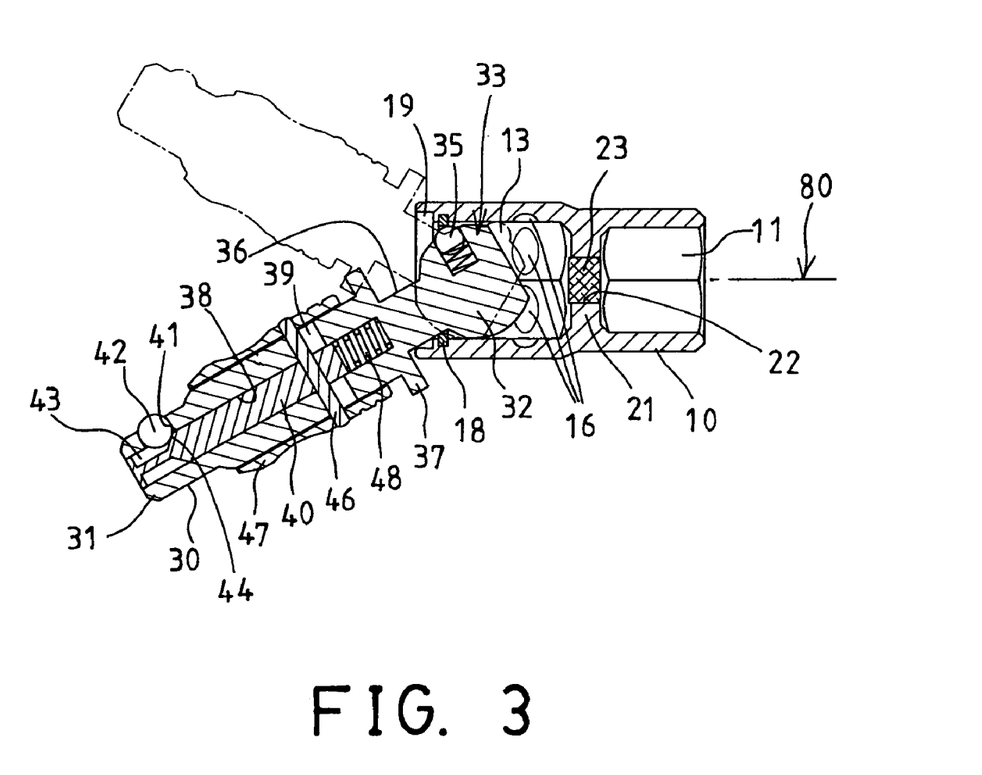
FIG. 3 is a cross sectional view similar to FIG. 2, illustrating the operation of the tool connecting device.
Figure 4:
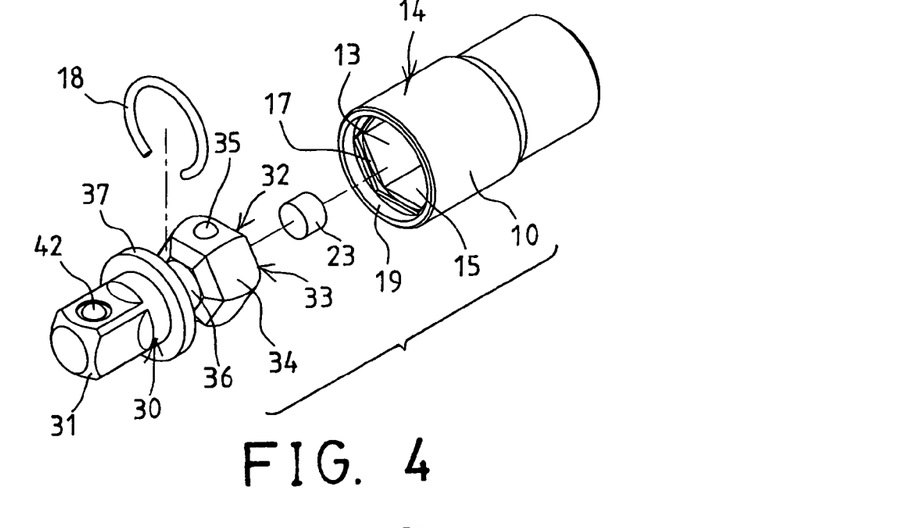
FIG. 4 is a further partial exploded view similar to FIG. 1, illustrating the other arrangement or application of the tool connecting device.
Figure 5:
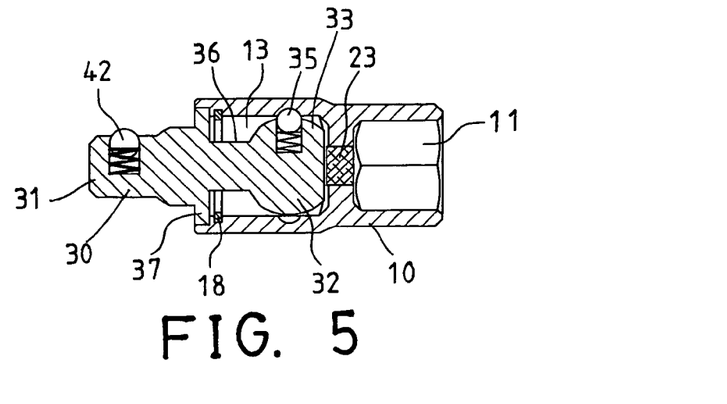
FIGS. 5, 6 are cross sectional views of the tool connecting device as shown in FIG. 4, illustrating the operation of the tool connecting device.
Figure 6:
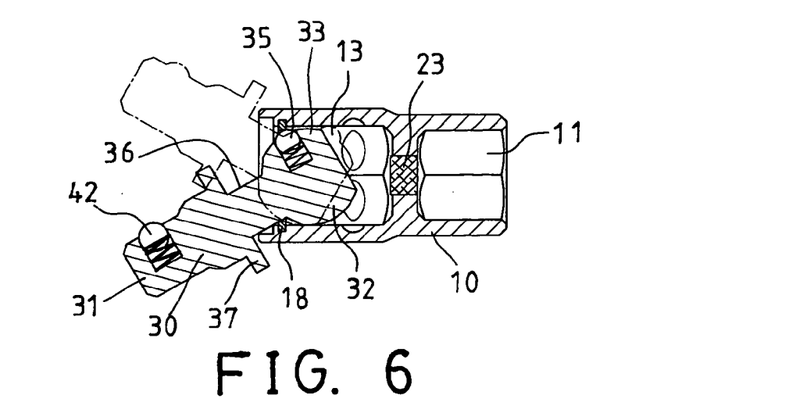
Figure 7:
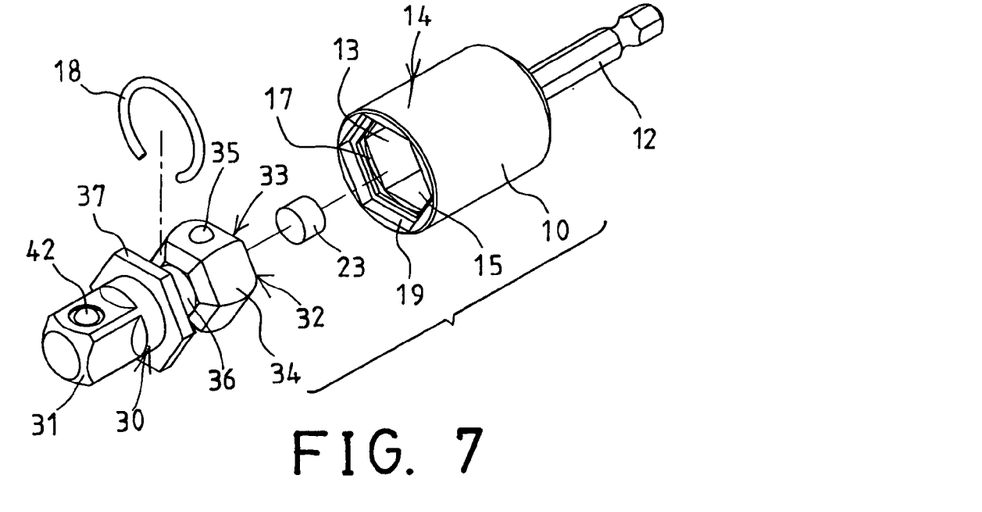
FIG. 7 is a still further partial exploded view similar to FIGS. 1 and 4, illustrating the further arrangement or application of the tool connecting device.

The spatial engaging member 32 of the tool shank 30 includes a non-circular cross section, such as a hexagonal cross section (FIGS. 1, 4, 7, 11, 14) or octangular j(FIG. 10) cross section having one or more curved or flat surfaces 34 formed in outer peripheral portion thereof for engaging with the corresponding non-circular socket opening 13 and/or the corresponding flat surfaces 15 of the tool mount 10 for allowing the spatial engaging member 32 to be tilted or pivoted relative to the longitudinal axis 80 of the tool mount 10 to different angular position as shown in FIG. 3, and also for allowing the spatial engaging member 32 to be rotated or driven by the tool mount 10 when the tool mount 10 is rotated or driven by the driving tools (not shown), by the engagement of the curved surfaces 34 of the tool shank 30 and the flat surfaces 15 of the tool mount 10.

The tool shank 30 includes one or more spring-biased projections 35 attached thereto and partially extended out from either of the curved surfaces 34 thereof for engaging with either of the indentions 16 of the tool mount 10 and for suitably positioning or anchoring the spatial engaging member 32 of the tool shank 30 to the tool mount 10. In addition, the magnetic member 23 may also be used to attract the spatial engaging member 32 of the tool shank 30 or the driven members 8, 82, 88 to the tool mount 10 and to further position or anchor the spatial engaging member 32 of the tool shank 30 or the driving members to the tool mount 10.

The tool shank 30 further includes a peripheral depression 36 formed therein, such as formed in the middle portion thereof and located between the spatial engaging member 32 and the tool shank 30 for selectively engaging with the retaining member 18 (FIG. 3) which may anchor and secure the spatial engaging member 32 of the tool shank 30 in engagement with the tool mount 10, and for preventing the spatial engaging member 32 of the tool shank 30 from being disengaged from the tool mount 10. The formation or the provision of the peripheral depression 36 in the tool shank 30 allows the tool shank 30 to be suitably and selectively slanted or tilted or pivoted relative to the longitudinal axis 80 of the tool mount 10 to different angular position.

The tool shank 30 further includes a peripheral protrusion 37 formed thereon or extended therefrom, such as formed and located closer to the tool shank 30 but spaced away from or distal to the spatial engaging member 32 for selectively engaging with or into the enlarged peripheral shoulder 19 of the tool mount 10 when the spatial engaging member 32 of the tool shank 30 is completely engaged into the socket opening 13 of the tool mount 10 (FIGS. 2, 5, 8, 12 and 15), in order to stably or solidly anchor or secure the spatial engaging member 32 of the tool shank 30 to the tool mount 10 and to prevent the tool shank 30 from being slanted or tilted or pivoted relative to the longitudinal axis 80 of the tool mount 10. The peripheral protrusion 37 may include a circular (FIGS. 4, 11, 14) or a non-circular (FIGS. 1, 7, 10) shape for engaging with the corresponding peripheral shoulder 19 of the tool mount 10.

The tool shank 30 further includes a longitudinal or axial bore 38 formed therein, such as formed and opened toward one end or opened away from the spatial engaging member 32 for slidably receiving a rod 40 therein, and includes an orifice 39 formed thereon, such as formed in the middle portion thereof and communicating with the longitudinal or axial bore 38 of the tool shank 30, and further includes an aperture 41 formed thereon, such as formed in the free end portion thereof and located opposite or distal to the spatial engaging member 32 and also communicating with the longitudinal or axial bore 38 of the tool shank 30 for receiving a ball or projection 42.

The rod 40 includes a recess 43, such as a peripheral recess 43 formed in one end thereof for selectively receiving the projection 42, and includes an actuator 44 for forming or defining the peripheral recess 43 thereof, in which the actuator 44 may be provided for engaging with the projection 42 for selectively moving or forcing the projection 42 out of the tool shank 30 to engage with the various driven or driving tools (not shown), and to detachably attach or secure the various driven or driving tools to the tool shank 30. The rod 40 further includes a hole 45 formed therein for aligning with the orifice 39 of the tool shank 30 and for receiving a pin 46 which is slidably engaged in the orifice 39 of the tool shank 30.

A control ferrule 47 is further provided and slidably engaged onto the tool shank 30, and the pin 46 is engaged into the control ferrule 47 and secured to the control ferrule 47 for coupling the control ferrule 47 to the rod 40 and for allowing the rod 40 to be moved relative to the tool shank 30 with the control ferrule 47, or for allowing the control ferrule 47 to move the rod 40 relative to the tool shank 30 and to have the projection 42 to be selectively received in the recess 43 of the rod 40 and thus for allowing the various driven or driving tools to be selectively released from the tool shank 30.

The control ferrule 47 may move the rod 40 relative to the tool shank 30 against a spring member 48. For example, the spring member 48 may further be provided and engaged into the longitudinal or axial bore 38 of the tool shank 30 and engaged with the rod 40 for biasing or forcing the actuator 44 to engage with the projection 42 and to selectively move or force the projection 42 out of the tool shank 30. The rod 40 and/or the spring member 48 may thus be used or acted as an actuating means or device for actuating the projection 42 to engage with the various driven or driving tools (not shown), and to detachably attach or secure the various driven or driving tools to the tool shank 30.

In operation, as shown in FIG. 2, the peripheral protrusion 37 of the tool shank 30 may be selectively engaged with or into the enlarged peripheral shoulder 19 of the tool mount 10 to stably or solidly anchor or secure the spatial engaging member 32 of the tool shank 30 to the tool mount 10 and to prevent the tool shank 30 from being slanted or tilted or pivoted relative to the longitudinal axis 80 of the tool mount 10 and to allow the tool shank 30 to be retained in line with the longitudinal axis 80 of the tool mount 10, and thus to allow the tool shank 30 to be solidly and effectively rotated or driven by the tool mount 10.

As shown in FIG. 3, when the peripheral protrusion 37 of the tool shank 30 is disengaged or separated from the socket opening 13 of the tool mount 10 and/or when the retaining member 18 is selectively engaged with the peripheral depression 36 of the tool shank 30, the spatial engaging member 32 of the tool shank 30 may be anchored or secured or retained in engagement with the tool mount 10 to prevent the spatial engaging member 32 of the tool shank 30 from being disengaged from the tool mount 10, but to allow the tool shank 30 to be suitably and selectively slanted or tilted or pivoted relative to the longitudinal axis 80 of the tool mount 10 to different angular position. The engagement of the curved surfaces 34 of the tool shank 30 with the flat surfaces 15 of the tool mount 10 allows the tool mount 10 to be rotated or driven by the tool shank 30 even when the tool shank 30 is slanted or tilted relative to the longitudinal axis 80 of the tool mount 10 to different angular position.

It is to be noted that the various driven or driving tools that are attached or coupled to the tool shank 30 may be engaged or located in the tiny spaces or the like in the vehicles or in the other machines or facilities and may not be easily reached and rotated or driven by various driving members or tools. With the tool connecting device in accordance with the present invention, the tool shank 30 may be suitably and selectively slanted or tilted relative to the tool mount 10 to different angular position and to allow various driven members 8 to be suitably rotated or driven by the tool mount 10 and the tool shank 30. The peripheral protrusion 37 of the tool shank 30 may be used or acted as an anchoring means or device for selectively anchoring or securing the tool shank 30 and the tool mount 10 together, and for anchoring or retaining the tool shank 30 in line with the tool mount 10 and for preventing the tool shank 30 from being tilted relative to the tool mount 10 to the other angular positions.

Figure 11:
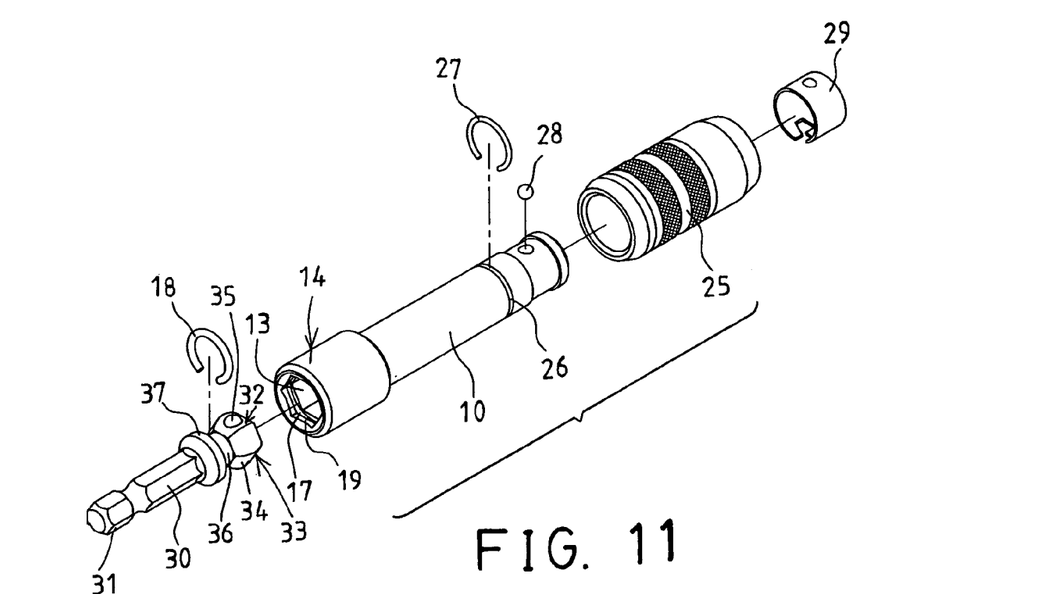
FIG. 11 is a still further partial exploded view similar to FIGS. 1, 4, 7 and 10, illustrating the still further arrangement or application of the tool connecting device.
Figure 12:
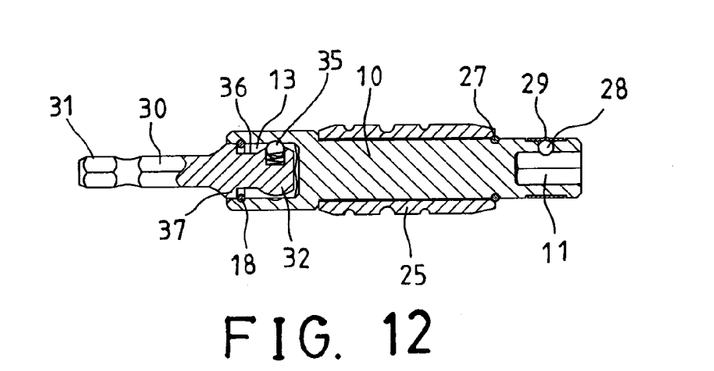
FIGS. 12, 13 are cross sectional views of the tool connecting device as shown in FIG. 11, illustrating the operation of the tool connecting device.
Figure 13:
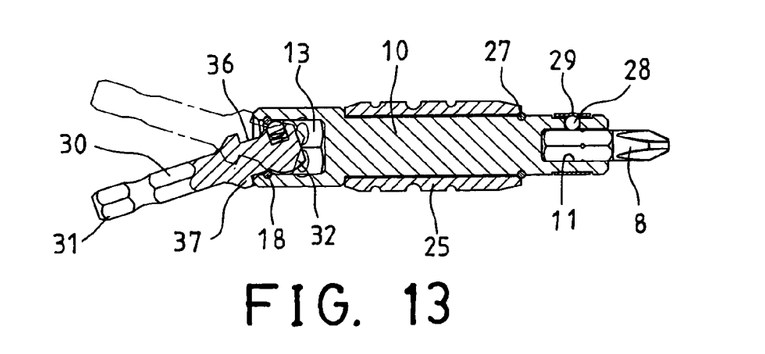

Alternatively, as shown in FIGS. 11-16, the tool mount 10 may further include a sleeve 25 slidably engaged thereon for being held by the user and for allowing the tool mount 10 to be freely rotated relative to the sleeve 25, and the tool mount 10 may further include a peripheral groove 26 formed in the outer peripheral portion thereof for receiving another clamping or retaining member 27 therein which may be engaged with the sleeve 25 for anchoring the sleeve 25 to the tool mount 10 and for preventing the sleeve 25 from being slid or moved longitudinally or axially relative to the tool mount 10. As shown in FIGS. 11-13, the tool mount 10 may further include another ball or projection 28 engaged into the engaging hole 11 of the tool mount 10 and a further spring member 29 engaged onto the ball or projection 28 for biasing and forcing the ball or projection 28 to engage with the driven member 8 (FIG. 13) and for selectively anchoring or positioning the driven member 8 to the tool mount 10.

Figure 14:
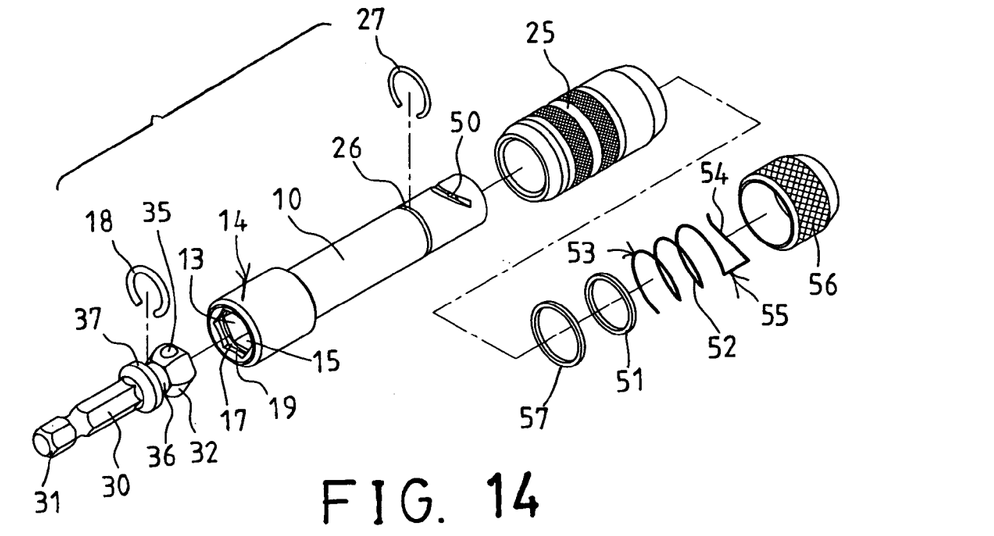
FIG. 14 is a still further partial exploded view similar to FIGS. 1, 4, 7, 10 and 11, illustrating the still further arrangement or application of the tool connecting device.
Figure 15:
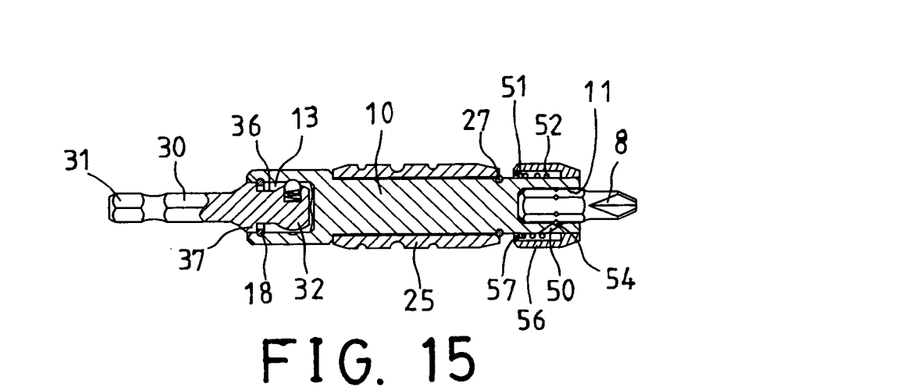
FIGS. 15, 16 are cross sectional views of the tool connecting device as shown in FIG. 14, illustrating the operation of the tool connecting device.
Figure 16:
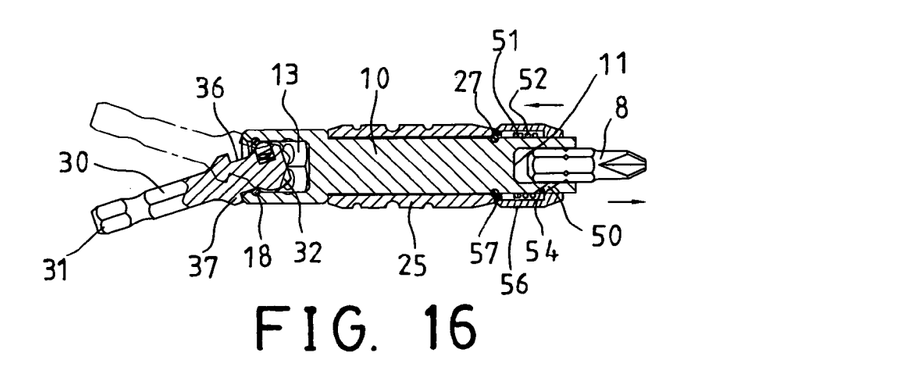

As shown in FIGS. 14-16, the tool mount 10 may further include an inclined passage 50 formed in the outer peripheral portion and inclined relative to the tool mount 10, and intersecting or communicating with the engaging hole 11 of the housing 10 for communicating the engaging hole 11 of the housing 10 with the outside of the housing 10, best shown in FIGS. 15-16. An anchoring member or ring 51 is attached or secured onto the outer peripheral portion of the housing 10.

A spring member 52, such as a coil spring member 52 is provided and engaged onto the outer peripheral portion of the tool mount 10, and includes one end 53 for engaging with the anchoring member 51 and for being anchored or positioned or attached to the tool mount 10, and includes a bent or spring latching segment 54 formed or provided on the other end 55 of the spring member 52 for engaging through the inclined passage 50 of the tool mount 10 (FIG. 15), and for engaging into the engaging hole 11 of the tool mount 10 and thus for selectively and resiliently engaging with the screwdriver bit 8. It is arranged that the latching segment 54 of the spring member 52 is engaged with the screwdriver bit 8 when the spring member 52 has not been compressed.

A control ferrule or slidable barrel 56 is slidably engaged onto the tool mount 10, and is engaged with the spring member 52 for selectively depressing or compressing the spring member 52 toward the anchoring member 51 or against the spring member 52 by moving the barrel 56 toward the anchoring member 51, and thus for selectively disengaging or separating the latching segment 54 of the spring member 52 from the screwdriver bit 8, and thus for allowing the screwdriver bit 8 to be disengaged or removed from the tool mount 10. The barrel 56 may thus be formed and acted as a disengaging means for selectively disengaging or separating the latching segment 54 of the spring member 52 from the screwdriver bit 8.

The barrel 56 further includes a positioning ring 57 attached to one end portion thereof for engaging with the anchoring member 51 and for limiting the barrel 56 to move relative to the tool mount 10, and for preventing the barrel 56 from being disengaged from the tool mount 10. It is preferable that the barrel 56 is engaged with the other end 55 of the spring member 52 and the spring latching segment 54 of the spring member 52 is resiliently engaged with the screwdriver bit 8 when the positioning ring 57 is biased to engage with the anchoring member 51 by the spring member 52.

It is to be noted that the spring latching segment 54 is formed integral and bent from the spring member 52 and thus will not be disengaged from the spring member 52 such that the spring latching segment 54 may be easily and quickly engaged through the inclined passage 50 and engaged into the engaging hole 11 of the tool mount 10 to resiliently engage with the screwdriver bit 8 when the spring member 52 is engaged onto the outer peripheral portion of the tool mount 10, without particularly engaging the latching segment 54 of the spring member 52 into the inclined passage 50 of the tool mount 10.

Accordingly, the tool connecting device in accordance with the present invention may be provided for connecting a tool shank or a fastener or a work piece or a driven member to a tool mount to allow the tool shank or the fastener or the work piece or the driven member to be selectively secured to the tool mount and rotated in concert with the tool mount or to be rotated or driven by the tool mount or to be selectively tilted or pivoted relative to the tool mount to various angular positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool connecting device comprising:
   a tool mount including a first end having a coupling device provided thereon, and including a second end having a non-circular socket opening formed therein and having at least one flat surface formed therein,
   a tool shank including a non-circular spatial engaging member provided on a first end and selectively engaged with said non-circular socket opening of said tool mount and having at least one curved surface formed therein for selectively engaging with said non-circular socket opening and said at least one flat surface of said tool mount, to allow said tool shank to be selectively tilted relative to said tool mount to different angular position, and said tool shank including a second end for coupling to a tool member, and said tool shank including an aperture formed therein, and including an axial bore formed in said tool shank,
   a projection slidably received in said aperture of said tool shank,
   a rod slidably received in said axial bore of said tool shank, said rod including a recess formed therein for selectively receiving said projection and for forming an actuator, and said actuator being provided for engaging with said projection and for selectively moving and forcing said projection out of said tool shank to engage with said tool member,
   a control ferrule slidably engaged onto said tool shank and coupled to said rod for moving said rod relative to said tool shank and to have said projection to be selectively received in said recess of said rod, and
   means for selectively anchoring said tool shank and said tool mount together to retain said tool shank in line with said tool mount and to prevent said tool shank from being tilted relative to said tool mount to other angular positions.

2. The tool connecting device as claimed in claim 1, wherein said anchoring means includes a protrusion extended from said tool shank for selectively engaging with said socket opening of said tool mount to solidly anchor said spatial engaging member of said tool shank to said tool mount and to prevent said tool shank from being tilted relative to said tool mount.

3. The tool connecting device as claimed in claim 2, wherein said tool mount includes a peripheral shoulder formed in an outer portion thereof and having an inner diameter greater than that of said socket opening of said tool mount for selectively engaging with said protrusion of said tool shank.

4. The tool connecting device as claimed in claim 1, wherein said tool shank includes a peripheral depression formed therein and arranged for allowing said tool shank to be slanted and tilted relative to said tool mount to different angular position.

5. The tool connecting device as claimed in claim 4, wherein said tool mount includes a retaining member disposed therein for selectively engaging with said spatial engaging member of said tool shank and for preventing said spatial engaging member of said tool shank from being disengaged from said tool mount.

6. The tool connecting device as claimed in claim 1, wherein said tool mount includes a magnetic member disposed therein for attracting said spatial engaging member of said tool shank to said tool mount.

7. The tool connecting device as claimed in claim 6, wherein said tool mount includes an inner peripheral swelling extended radially and inwardly into said socket opening thereof to form a compartment therein and to receive said magnetic member therein.

8. The tool connecting device as claimed in claim 1, wherein said coupling device is an engaging hole formed in said first end of said tool mount.

9. The tool connecting device as claimed in claim 1, wherein said tool shank includes a spring-biased projection attached thereto for engaging with said tool mount and for anchoring said spatial engaging member of said tool shank to said tool mount.

10. The tool connecting device as claimed in claim 9, wherein said spring-biased projection is extended out from said at least one curved surface of said tool shank for engaging with said at least one flat surface of said tool mount.

11. The tool connecting device as claimed in claim 9, wherein said tool mount includes an indention formed therein for engaging with said spring-biased projection of said tool shank.

* * * * *